United States Patent [19]

Haldimann

[11] Patent Number: 4,467,725
[45] Date of Patent: Aug. 28, 1984

[54] CONTINUOUS SHELF STORAGE SYSTEM UTILIZING THE GRAVITY FEED PRINCIPLE

[75] Inventor: Hans R. Haldimann, Montagnola, Switzerland

[73] Assignee: Tortuga S.A., Luxembourg, Luxembourg

[21] Appl. No.: 351,655

[22] Filed: Feb. 24, 1982

[30] Foreign Application Priority Data

Feb. 25, 1981 [CH] Switzerland ............... 1242/81

[51] Int. Cl.³ .................................. B61B 13/12
[52] U.S. Cl. .................... 104/162; 198/718; 414/241; 414/280
[58] Field of Search ............... 104/162; 414/241, 277, 414/280; 254/35; 198/718, 744

[56] References Cited

U.S. PATENT DOCUMENTS

| 3,744,621 | 7/1973 | Adams et al. | 198/744 X |
| 3,786,911 | 1/1974 | Milazzo | 198/718 |
| 4,200,421 | 4/1980 | Haldimann | 414/280 |
| 4,202,440 | 5/1980 | Niki | 198/744 X |

FOREIGN PATENT DOCUMENTS

| 618673 | 9/1935 | Fed. Rep. of Germany | 104/162 |
| 1913834 | 9/1970 | Fed. Rep. of Germany | 104/162 |

*Primary Examiner*—Randolph Reese
*Attorney, Agent, or Firm*—A. A. Saffitz

[57] ABSTRACT

A continuous rack support apparatus utilizing the gravity feed principle and in which goods to be stored are supported on rolling vehicles comprises thrust rods which are formed as motional impulse generators and arranged so as to be longitudinally displaceable in the center of a track. Pawls are associated with the thrust rods for acting upon the rolling vehicles. Each thrust rod has a locking member for holding it in a locked position following a displacement against the action of a spring. The locking member can be disengaged by the foremost rolling vehicle when the latter is removed. Along the thrust rods are wedges with which the pawls come into contact upon displacement of the thrust rods against the action of the spring to cause the wedges to swivel into a rest position below the track.

4 Claims, 7 Drawing Figures

CONTINUOUS SHELF STORAGE SYSTEM UTILIZING THE GRAVITY FEED PRINCIPLE

This invention relates to continuous rack support apparatus which utilise the gravity feed principle, and on which goods to be stored are supported on mobile support and transport units. These are known in a variety of embodiments. These support and transport units are put into racks provided with rails and the individual rack channels have a certain inclination of the rails.

There are basically two possibilities in this respect:

In the first one, the stored goods are removed from the lower end of the rack channel, while the rack channels are loaded with the goods to be stored at the higher end. In this case the mobile support and transport units are conveyed further from the feed end of the rack channel under the effect of gravity; this means that the rack channel must be inclined so that the support and transport units start to move automatically. On the other hand, this construction necessitates the provision of speed control means, e.g. brakes, along the rack channel, to prevent any of the inserted support and transport units reaching an inadmissably high speed.

The second possibility is characterized by the loading and removing of the transport units from the same, i.e. lower, rack end. In this case the support and transport units to be inserted are driven upwards against the effect of gravity and the load disposed at the lowest point at the end abuts stop members in each case. The inclination of the rails on which the support and transport units run must be relatively steep in this case as well, as it must be sufficient to allow the support and transport units to start from a standstill, even under unfavorable circumstances. In this case, however, the movement which has commenced leads to a considerable acceleration of the support and transport units, as the frictional forces are essentially smaller during their movement than when they are stationary.

The applicants have already proposed, e.g. in Austrian Pat. No. 338,175, a construction having the advantage that no brakes or speed control devices are required, without giving rise to the danger of the support and transport units being accelerated to inadmissibly high speeds. This proposal by the applicants is based on the idea of making the inclination of the rails within a rack channel so slight that this prevents the support and transport units from automatically starting to move, but that, on the other hand, a rolling vehicle is essentially neither accelerated nor braked. Each time a rolling vehicle is removed from the apparatus, each of the other vehicles still in the rack channel receives a motional impulse which causes the latter to move towards the removal end.

These motional impulses, which are appropriately triggered by a receiving device which removes a rolling vehicle from the rack channel, suffice to move the individual rolling vehicles by several vehicle lengths, and in practice a rolling vehicle comes slowly to a standstill again without additional brake devices being necessary.

A preferred embodiment of an apparatus of this kind comprises a thrust rod which is displaceably mounted between the rails, for example, and which is subject to the action of a spring which tends to push the thrust rod towards the removal end. The thrust rod has entrainment means, which can lie against a transverse bar of the support and transport units. When the receiving device comes to rest, the thrust rod is pushed back against the action of the spring. As soon as the receiving device has received a rolling vehicle disposed at the removal end of the rack channel and moved away from the rack again, the thrust rod is moved under the action of the spring force and imparts to the other rolling vehicles disposed in the rack channel a motional impulse until the latter have reached the removal end.

Although this construction has proved very successful, it does, however, entail several disadvantages. In order to operate an apparatus of this kind according to the second of the above-mentioned proposals,—i.e. removal and loading of a rack channel takes place at the same, at a lower end—, the pawls applied to the thrust rod should not lie against the support and transport units while the rack channel is loaded with support and transport units. A further requisite is that the pawls, which are subject to a spring force, do not exert any force on the support and transport units while the latter are at a standstill, i.e. that these do not permanently press against the end stops. This permanent force represents a moment of danger for the operators who, under certain circumstances, might not recognise this force effect. In the case of projecting loads and soft packaging, it may also cause damage to the stored material.

The object of the present invention is to improve a continuous rack support apparatus of the above-mentioned type so as to eliminate these disadvantages. A particular intention is to provide the possibility of inserting the load which is to be newly introduced into the rack channel against the action of the force of gravity without difficulties and of the stored rolling vehicle remaining stationary in the rack channel without an external force effect until it is removed.

An embodiment of apparatus in accordance with the invention is described in detail hereafter and is schematically illustrated in the accompanying drawings, in which.

Figure 1:
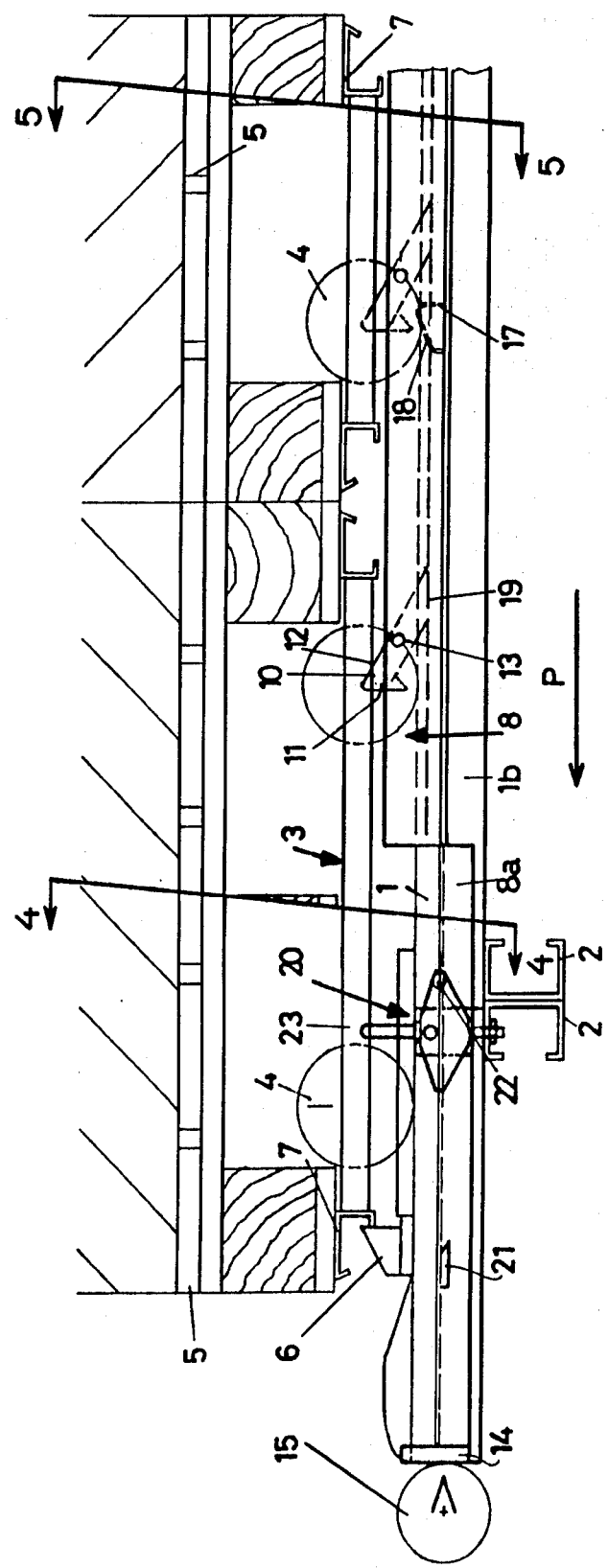
FIG. 1 is a schematic partial longitudinal section through a support channel in the rest position, without a receiving device in the rest position.
Figure 2:
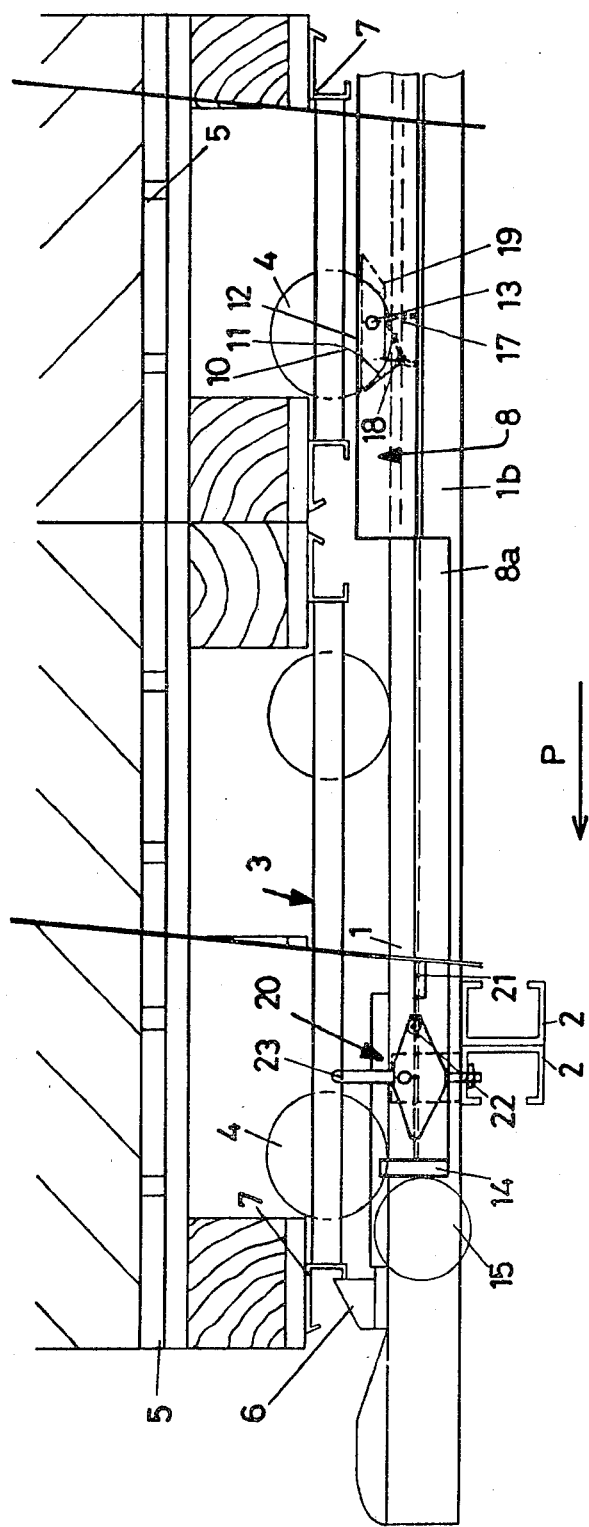
FIG. 2 is a section corresponding to FIG. 1, but with a receiving device in the rest position.

According to FIGS. 1 and 2, the apparatus comprises a bearing support with rails 1, which are supported on transverse bars 2. Support and transport units 3 have wheels 4 which run on the rails 1 and bear loaded pallets 5, for example. The rails 1 comprise end stops 6, against which there strike the front transverse bars 7 of the outermost support and transport unit 3, as the rails 6 are inclined somewhat in the direction of the arrow P.

The inclination of the rails 1 is such that the support and transport units 3 can by no means start automatically, but, when moving, are at most moderately retarded, as the acceleration caused by the inclination of the rails is at most as great as the retardation determined by the rolling resistance of the wheels.

Figure 3:
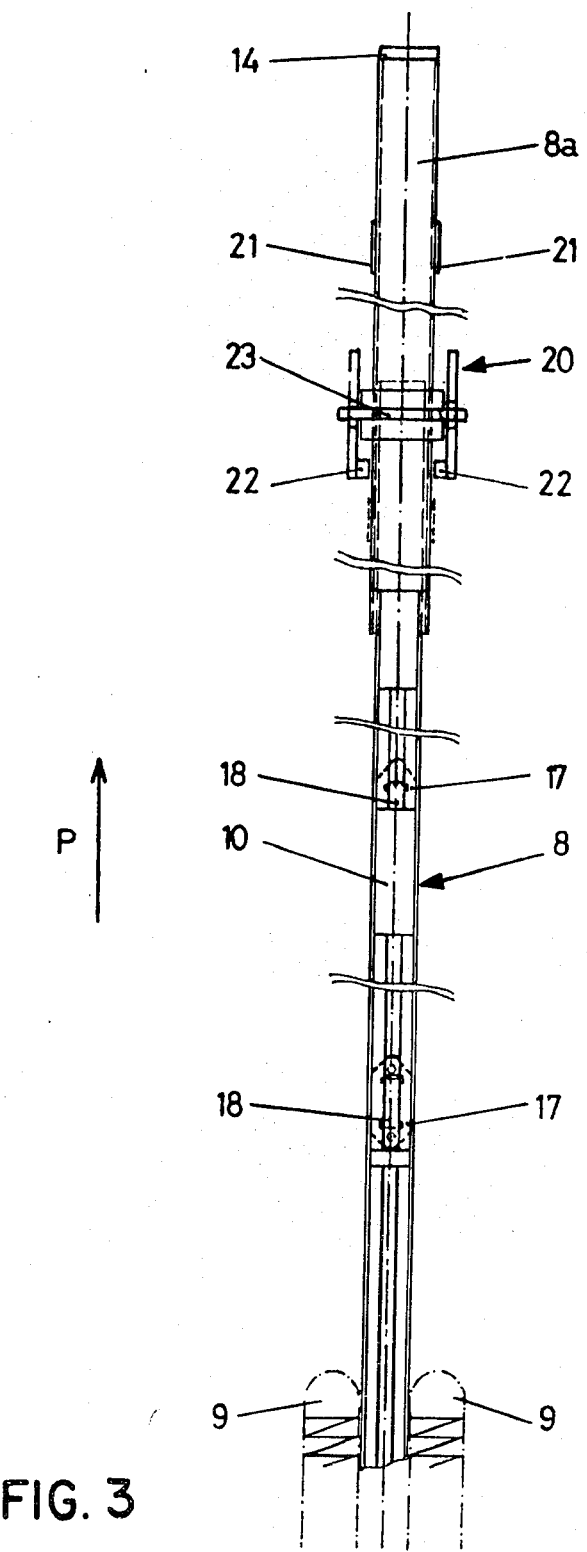
FIG. 3 is a plan view of the rod.

A thrust rod, generally indicated by 8, is displaceably mounted in the center between one pair of rails. This thrust rod 8 is subject to the action of springs 9 (FIG. 3), which tend to move the thrust rod in the direction of the arrow P. The thrust rod 8 has pivotably mounted pawls 10, which project beyond the surface of the thrust rod 8 when in their swung-out rest position and thus lie in the path of movement of the transverse bars 7 of the support and transport units 3. These pawls 10 at the front have a thrust face 11, which extends essentially vertically and which is designed to rest against the transverse bars 7 while the advance impulse is being imparted. However, the rear face 12 of the pawls is inclined, so that a support and transport unit 3 moving over the pawl can pass over the pawl 10, as this may dip on account of its pivotable mounting about the axis 13.

A butt plate 14 is arranged at the front end of the thrust rod 8 and a correspondingly arranged butt element of the receiving vehicle, which is not shown, comes to rest against this butt plate 14, when the said receiving vehicle comes to rest at the removal end of the rack channel. This butt element of the receiving device is indicated as a roller 15 in FIGS. 1 and 2.

The thrust rod 8 is displaceably guided on a guide rod 16. The latter has wedges or guide shoes 17, which have an inclined upper abutting surface 18. A guide shoe 17 is associated in sliding arrangement, the shoe being wedge-shaped to accommodate the surface of the pawl so that one shoe 17 is combined with each pawl 10. As can clearly be seen from FIG. 1, the guide shoes 17 do not have any effect when the thrust rod 8 is extended. However, if the thrust rod 8 is pushed back under the effect of the roller 15 of the receiving device, the lower faces 19 of the pawls 10 reach the range of effectiveness of the abutting surfaces 18 of the guide shoes 17 associated with those pawls 10, so that the latter are pivoted about their axis 13 until they are lowered into the thrust rod 8. As a result, the thrust faces 11 of the pawls 10 are no longer in the area of movement of the transverse bars 7 of the support and transport units 3, so that these can be moved against the direction of the arrow P inside the rack channel.

Means are also provided to lock the thrust rod in its retracted position shown in FIG. 1. These means comprise a pivotable locking pawl 20, which is arranged in the region of the front end of the rack channel, and wedge-shaped locking cams 21, which are laterally arranged at the front end 8a of the thrust rod. Further details will be given in the following concerning the specific construction of the locking pawl 20.

It is essential, when the thrust rod 8 is pushed back, for the locking cam 21 to reach the range of effectiveness of the locking pawl 20, which prevents the thrust rod 8 being moved back into its initial position (in the direction of the arrow P). For this purpose the locking pawl 20 has a stop pin 22, against which the locking cam 21 lies, as long as the pawl 20 is in its upright rest position. Owing to the fact that the receiving device, which presses with its roller 15 against the face 14 of the thrust rod 8, has come to rest, the thrust rod 8 is also prevented from moving under the action of the spring 9 in the direction of the arrow P (cf. FIG. 2). The receiving device then withdraws the foremost support and transport unit from the rack channel; this does not entail any difficulties, as the pawls 10 are lowered and the thrust rod 8 is held in its rear end position.

While the foremost support and transport unit is being withdrawn, the receiving device executes a so-called partial withdrawal, so that the roller 15 no longer lies against the face 14 of the thrust rod 8. The latter, however, is nevertheless held in its pushed back end position, as the upright locking pawl 20 prevents the advance of the rod 8, owing to the fact that the lug cam 21 lies against the stop pin 22 of the pawl 20. Shortly before the support and transport unit which is to be removed leaves the rack channel, its rear transverse bar 7 reaches the region of the release bar 23 of the locking pawl 20, swivels the latter and the thrust rod 8 can thus move forwards in the direction of the arrow P, as the stop pin 22 has been swung out of the area of movement of the cam 21. As a result, however, the pawls 10 also move out of the range of effectiveness of the guide shoes 17, so that the pawls 10 move into an upright position under the effect of gravity and their face 11 strikes against the transverse bars 7 of the support and transport units which are still in the rack channel. During the forward movement of the thrust rod 8, the support and transport units 3 thus receive a motional impulse, which is sufficient to overcome the static friction of the rollers 4 on the rails 1; the support and transport units 3 move gently forwards until the front one is arrested by the stop 6.

A constant pressure on the transverse bars 7 is thus prevented in the case of upright support and transport units, if the spacing and the arrangement of the individual pawls 10 is smaller than the spacing of the transverse bars 7 of a single support and transport unit 3. It is thus possible for the support and transport units 3 to receive a true motional impulse, in order freely to roll. The travel of the thrust rod 8 is correspondingly essentially less than the spacing of the front and rear transverse bars 7 of a support and transport unit 3, so as to ensure that none of the faces 11 of the pawls 10 can permanently lie against one of the transverse bars 7.

There are basically two possibilities in the following motion cycle:

1. A further support and transport unit is to be removed.
2. A new support and transport unit is to be inserted in the rack channel.

First possibility:

Owing to the fact that the receiving device is coming to rest,—the roller 15 comes to rest against the face 14—, the thrust rod 8 is locked once more against the action of the spring 9 and the foremost support and transport unit 3 is removed in exactly the same manner as described above. During the partial withdrawal of the receiving device, the thrust rod 8 is released and as soon as the rear transverse bar 7 of the removed support and transport unit 3 has passed over the release bar 23 of the locking pawl 20, the thrust rod is released so that the support and transport units 3 which are to be advanced receive their motional impulse and are thus conveyed to the end of the rack channel.

Second possibility:

The receiving device, which has a support and transport unit 3 to be stored, comes to rest at the end of the rack channel and the thrust rod 8 is pushed back under the effect of the roller 15 against the action of the spring 9, so that the pawls 10 are pivoted under the effect of the guide shoes 17. When the support and transport unit 3 is inserted, the release bar 23 of the locking pawl 20 is passed over, so that the pawl 20 is swivelled and the locking effect of the pin 22 and the lug cam 21 is thus discontinued. However, as the roller 15 continues to press against the face 14, the thrust rod 8 cannot move forwards. On the other hand, it is easily possible to insert the support and transport unit 3 to be stored, as the pawls 10 are held in a lowered state. The locking pawl 20 again moves automatically into an upright position under the effect of gravity when the transverse bars have passed over the release bar 23, so that the receiving device can move away without the thrust rod 8 being moved in the direction of the arrow P, since the cam 21 again rests against the stop pin 22 of the locking pawl 20.

The thrust rod is then in the locked state, as, once a new support and transport unit 3 has been stored, there is no reason to allow the advance of other support and transport units 3 which are already in the rack channel. The locking device is only released in the manner described above if the foremost support and transport units 3, which are now disposed in the rack channel, are to be removed.

It should also be noted that other means for moving the thrust rod can also be used instead of the springs 9.

The following possibilities are mentioned purely by way of example:
Drive by pneumatic or hydraulic cylinder;
Drive by an electromagnet;
Gravity drive via a rope and pulley weight system.

In the latter case a plurality of thrust rods can be operated by the same driving weight in a simple manner.

Figure 4:
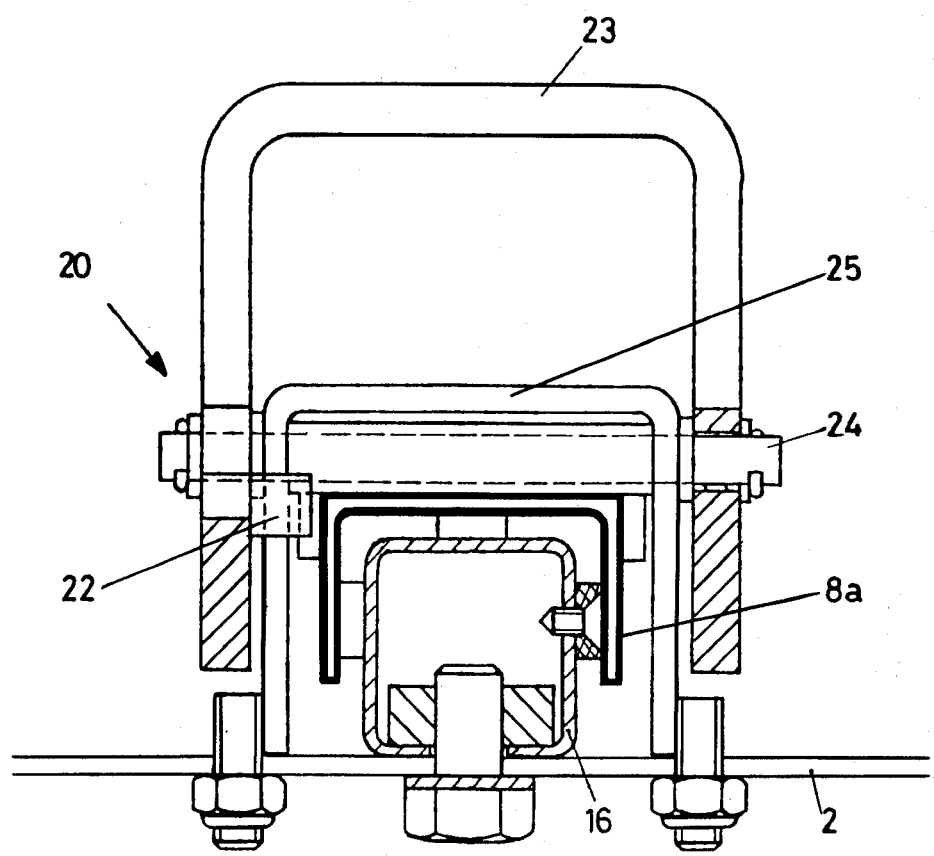
FIG. 4 is a section along line 4—4 of FIG. 1.
Figure 5:
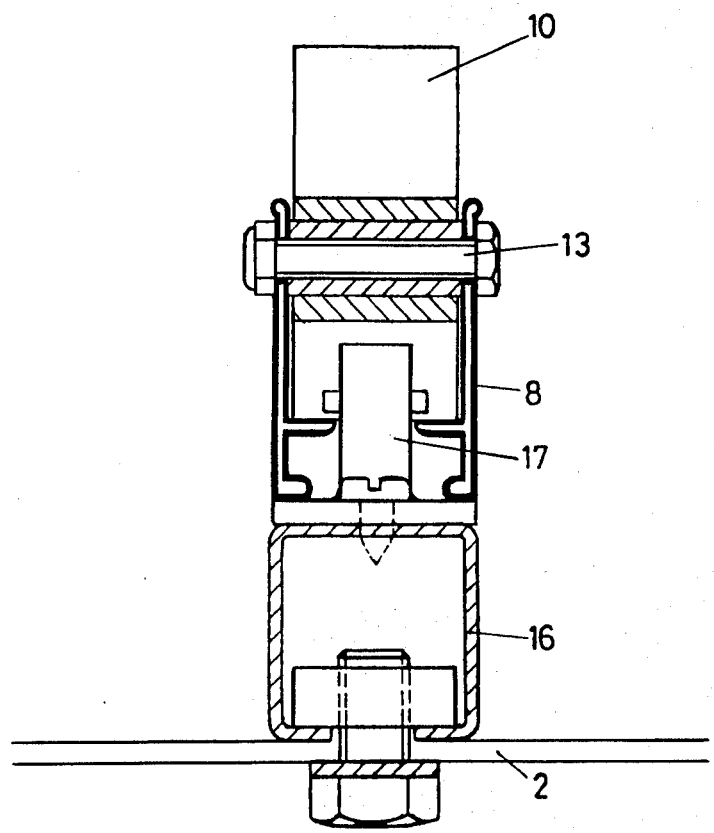
FIG. 5 is a section along line 5—5 of FIG. 1.

FIG. 4 shows the construction of the locking pawl 20 in greater detail. A retaining clip 25 is fastened to one of the transverse bars 2 by screws. The two side pieces of the retaining clip 25 receive a pin 24, which projects on both sides and at the ends of which the pawl body is pivotably mounted. The release bar 23, which projects upwards is secured to the upper part of the pin 24. Laterally arranged stop pins 22 are mounted on the pawl body and cooperate with the locking cams 21 of the thrust rod 8.

Figure 6:
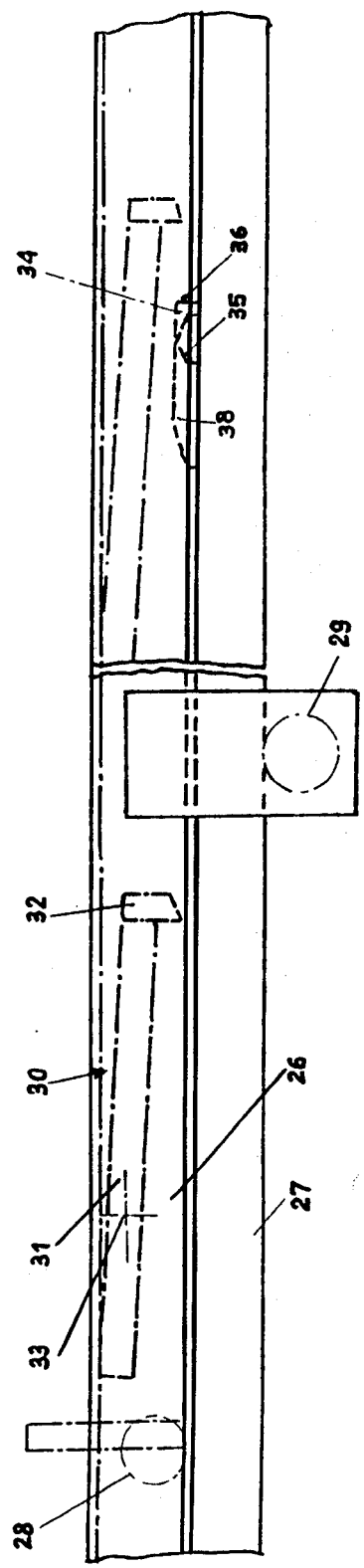
FIG. 6 is a variant of the locking device.

FIG. 6 shows a variant of the locking device which has just been described. The thrust rod 26, which can be moved in the direction of the arrow P and has an open-shaped cross section, is displaceably mounted on a stationary bearing tube 27 by means of rollers 28 and 29, respectively, which engage at the top and at the bottom. Locking members 30, evenly distributed in the longitudinal direction, are arranged in the center of the thrust rod 26 and consist in each case of an arm 31 and a locking hook 32. The latter is arranged at the end of the arm 31 which is pivotably mounted about an axis 33.

Figure 7:
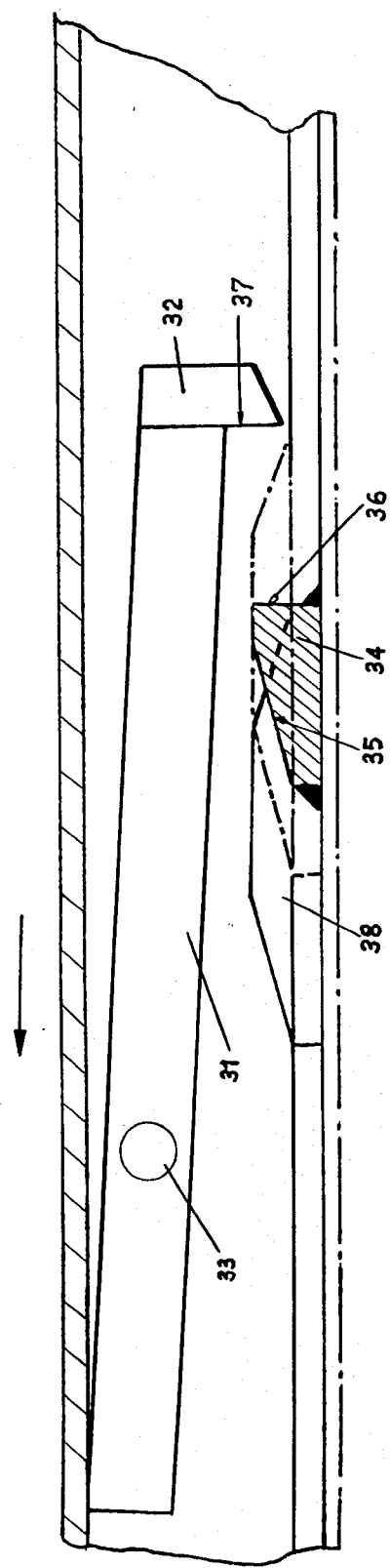
FIG. 7 is a detail of FIG. 6.

A catching member 34, which cooperates with the locking member 30, is also arranged on the bracing tube 27. The catching member 34 comprises an oblique abutting surface 35 and a vertical stop surface 36, against which the wall 37 of the locking hook comes to rest in the locked position. A control cam 38 is also displaceably arranged in the region of the catching member 34. The two positions of the control cam 38 are shown in FIGS. 6 and 7, respectively, FIG. 6 showing one position of the control cam 38 while FIG. 7 shows both positions of the control cam, one of the positions being in solid lines and the other one being in phantom lines. Accordingly, the showing in FIG. 6 is of one of two positions and the showing in FIG. 7 is of two positions. In the position according to FIG. 6 which is one of the two positions and shown in solid lines in FIG. 7 it can be seen that the control cam 38 does not affect the action of the locking member 30. However, if the control cam is moved into the position shown in FIG. 7, which is shown in phantom lines in FIG. 7, when the thrust rod moves to the left the locking hook comes into contact with the control cam 38 and slides over the catching member.

For this purpose the control cam 38 is not connected to the movement of the thrust rod 26 until the latter has executed the normal stroke and is further displaced. If the thrust rod has only executed the predetermined, normal stroke, the control cam remains in its inoperative position and the locking hook 32 engages in the catching member 34. In order to release the locking device, the thrust rod 26 is moved further against the spring action, so that the control cam 38 is entrained, whereupon the locking hook 32 is raised from the catching member 34.

The catching member therefore only engages if the thrust rod is moved by a predetermined, normal stroke. If, however, this stroke is exceeded, the control cam 38 is moved towards the catching member 34, so that the locking hook 32 cannot engage in the catching member.

The decision as whether or not the locking procedure should be performed can therefore be affected by the control of the transfer device. The catching member is again released by a further displacement of the thrust rod 26, which then entrains the control cam 38. The latter swivels the arm 31 in an anti-clockwise direction, as a result of which the locking hook 32 is disengaged.

I claim:

1. In a continuous shelf storage system in which goods to be stored are placed in mobile storage and transporting units on shelves, these units each provided a load bearing pallet, a vehicle body and rollers which roll on a pair of rails which are only slightly inclined;

a motional impulse generator which is longitudinally displaceable in the center of the spacing between said pair of rails adapted to push one of said units for movement along said pair of rails by a distance of at least several vehicle lengths without requiring braking before coming to a standstill, said generator comprising:

a thrust rod assembly formed of an elongated rod member having a push engaging forward end for pushing engagement against the rear of a vehicle and a spring at the end remote from the push engaging forward end, said spring urging said elongated rod member into a locked non-operative position;

a locking device at the push engaging forward end of said thrust rod assembly to lock said assembly in a position to avoid pushing the unit and thereby place the thrust rod assembly in a non-operative position;

pivotable pawls connected to the forward end of said elongated rod member which fit against the unit to adapt the rod member to push said unit when the pawls are pivoted with one surface engaging the unit and adapting the rod member to disengage from the unit when moved away about the pivots of the pivotable pawls to release the assembly from the unit;

wedge shaped guide shoes, one for each pawl, guiding the surface of each pawl in its pushing relation to the end of the mobile unit; and said locking device being displaceable from a locking position to an open position by a first rolling unit when the unit is removed, the wedge shaped guide shoes guiding the pawls under spring action of the thrust rod assembly to bring the guide shoes to a ready position for pushing the next unit.

2. A continuous shelf storage system as claimed in claim 1 where said locking device comprises a pivoted means mounted at the push engaging forward end of said elongated rod member and further comprises two side pieces, stop pins between the side pieces and a release bar which lies in the path of the unit vehicle.

3. A continuous shelf storage system as claimed in claim 2 wherein said locking device is further provided with wedge-shaped locking cams secured to both sides of said elongated rod member, said locking cams being urged against said pins by the action of the spring to thereby prevent movement of said elongated rod member.

4. A continuous shelf storage system as claimed in claim 2 wherein the swivel axis of the pivoted detent of said locking device lies above the center of gravity of the locking device so that the pivoted detent returns to its initial position following a swivelling motion which passes over the release bar.

* * * * *